US009640164B2

(12) United States Patent
Gerken et al.

(10) Patent No.: US 9,640,164 B2
(45) Date of Patent: May 2, 2017

(54) SOUND ATTENUATION USING A CELLULAR CORE

(71) Applicant: The Boeing Company, Chicago, IL (US)

(72) Inventors: Noel Timothy Gerken, Maple Valley, WA (US); Eric Herrera, Coos Bay, OR (US); Garry Michael Duschl, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/633,514

(22) Filed: Feb. 27, 2015

(65) Prior Publication Data

US 2016/0253986 A1 Sep. 1, 2016

(51) Int. Cl.

| | |
|---|---|
| ***G10K 11/172*** | (2006.01) |
| ***F02C 7/045*** | (2006.01) |
| ***G10K 11/00*** | (2006.01) |

(52) U.S. Cl.

CPC .......... *G10K 11/002* (2013.01); *G10K 11/172* (2013.01)

(58) Field of Classification Search

CPC .. G10K 11/172; G10K 11/168; G10K 11/002; F02C 7/045; F02C 7/24; B32B 3/12; F02K 1/827

USPC .......................................................... 181/292

See application file for complete search history.

(56) References Cited

U.S. PATENT DOCUMENTS

| | | | | | |
|---|---|---|---|---|---|
| 4,257,998 | A | | 3/1981 | Diepenbrock, Jr. et al. | |
| 5,912,442 | A | | 6/1999 | Nye et al. | |
| 5,923,003 | A | * | 7/1999 | Arcas | B64C 21/04 181/213 |
| 6,114,652 | A | | 9/2000 | Clarke et al. | |
| 6,182,787 | B1 | * | 2/2001 | Kraft | F02C 7/045 181/292 |
| 6,245,408 | B1 | * | 6/2001 | Bitzer | F16F 7/121 428/118 |
| 6,439,340 | B1 | | 8/2002 | Shirvan | |
| 8,302,733 | B2 | | 11/2012 | Peiffer et al. | |
| 8,464,831 | B2 | * | 6/2013 | Olander Burak | F01D 25/162 181/290 |
| 8,820,477 | B1 | | 9/2014 | Herrera et al. | |
| 2012/0037449 | A1 | | 2/2012 | Ayle | |
| 2012/0168248 | A1 | | 7/2012 | Burak et al. | |
| 2013/0000247 | A1 | * | 1/2013 | Sypeck | B21D 47/00 52/793.1 |
| 2013/0157001 | A1 | * | 6/2013 | Knoff | D21H 27/30 428/118 |

(Continued)

OTHER PUBLICATIONS

"450g/m2 Triax carbon fabric HP-T450C," HP—Textile GmbH, product No. HP-T450, copyright 2008, 1 page, accessed Feb. 2, 2015. http://www.hp-textiles.com/shop/product_info.php/info/p965_450g-m--triax-carbon-fabric-hp-t450c.html.

(Continued)

*Primary Examiner* — Jeremy Luks

(74) *Attorney, Agent, or Firm* — Yee & Associates, P.C.

(57) ABSTRACT

A method and apparatus for attenuating sound. Air, through which acoustic waves are traveling, is received within a core comprised of a plurality of cells. The sound created by the acoustic waves is attenuated using a set of channels through a number of cell interfaces between cells of the plurality of cells by allowing the air to flow between the cells of the plurality of cells through the set of channels.

19 Claims, 7 Drawing Sheets

(56) References Cited

U.S. PATENT DOCUMENTS

2015/0027629 A1 1/2015 Butler et al.

OTHER PUBLICATIONS

Butler et al., "Composite Laminates Having Hole Patterns Produced by Controlled Fiber Placement," U.S. Appl. No. 13/953,392, filed Jul. 29, 2013, 39 pages.
Butler et al., "Septunnization of Honeycomb Sandwiches," U.S. Appl. No. 13/953,456, filed Jul. 29, 2013, 30 pages.
Gerken et al., "Septumization of Cellular Cores," U.S. Appl. No. 14/326,890, filed Jul. 9, 2014, 32 pages.
Herrera et al., "Automated Production of Acoustic Structures," U.S. Appl. No. 14/313,613, filed Jun. 24, 2014, 54 pages.
Extended European Search Report, dated Jul. 13, 2016, regarding Application No. 16155757.4 , 8 pages.

* cited by examiner

SOUND ATTENUATION USING A CELLULAR CORE

BACKGROUND INFORMATION

1. Field

The present disclosure relates generally to sound attenuation and, in particular, to sound attenuation using a cellular core. Still more particularly, the present disclosure relates to a method and apparatus for attenuating sound using cell interface channels between cells of a cellular core.

2. Background

Sound attenuation is the combined effect of scattering and absorption that, together, control sound. Scattering is the reflection of sound in directions other than the original direction of propagation of the sound. Absorption is the conversion of sound energy into other forms of energy. Different types of structures may be used to attenuate sound.

A structure that includes a honeycomb core sandwiched by a porous face sheet on one side and an impervious face sheet on the other side is an example of one type of structure that may be used to attenuate sound. A honeycomb core may take the form of, for example, without limitation, a cellular core that has the geometry of a honeycomb. Honeycomb cores may be used in different applications. As one example, honeycomb cores are oftentimes attached to the inner walls of the inlet ducts inside aircraft engine systems to attenuate the sound generated by these engine systems. However, some currently available honeycomb cores may be unable to provide the levels of sound attenuation desired without increasing the cost and weight of the aircraft more than desired.

For example, some currently available types of honeycomb cores use septa located within the cells of the honeycomb core to enhance sound attenuation. A septum may be an insert that is inserted into or formed internally within a cell. The septum may divide the single cell along the length of the cell. Although these type of septa may help with sound attenuation, fabricating these internal septa within the cells of the honeycomb core may be more laborious and technologically challenging than desired.

Further, the type and amount of material used to make these septa may make adding these septa to honeycomb cores more expensive than desired. In some cases, the cost associated with these septa may be more expensive than desired. For example, honeycomb cores having these internal septa may be four to five times more expensive than honeycomb cores with no internal septa.

Additionally, internal septa within the cells of a honeycomb core may increase the weight of the honeycomb core more than desired. This added weight may increase the weight of the platform within which the honeycomb core is installed more than desired. Therefore, it would be desirable to have a method and apparatus that take into account at least some of the issues discussed above, as well as other possible issues.

SUMMARY

In one illustrative example, an apparatus comprises a plurality of cells that form a core and a set of channels through a number of cell interfaces between cells of the plurality of cells. The set of channels allows air to flow between the cells of the plurality of cells. The set of channels has a configuration designed such that the core acoustically performs within selected tolerances.

In another illustrative example, a sound attenuation structure comprises a core. The core comprises a plurality of cells having a selected geometry. The core further comprises a set of channels through a number of cell interfaces between cells of the plurality of cells. The set of channels allows air to flow between the cells of the plurality of cells. The set of channels has a configuration designed such that the core acoustically performs within selected tolerances.

In yet another illustrative example, a method for attenuating sound is provided. Air, through which acoustic waves are traveling, is received within a core comprised of a plurality of cells. The sound created by the acoustic waves is attenuated using a set of channels through a number of cell interfaces between cells of the plurality of cells by allowing the air to flow between the cells of the plurality of cells through the set of channels.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a core capable of achieving a desired level of sound attenuation. In particular, the illustrative embodiments recognize and take into account that it may be desirable to achieve this desired level of sound attenuation in a platform, such as an aircraft, without increasing the weight and cost of the platform more than desired.

The illustrative embodiments recognize and take into account improved sound attenuation may be achieved by allowing air to flow through channels between the cells of a core. In particular, channels that pass through the cell interfaces between cells of a core may enable the flow of air, and thereby, sound waves, between the cells of the core. A cell interface may be the interface between two cells. This cell interface may be formed by one or more cell walls, depending on the implementation. The configuration of channels that pass through the cell interfaces of a core may be designed with respect to a set of acoustic parameters to achieve desired performance in sound attenuation.

Thus, the illustrative embodiments provide a method and apparatus for attenuating sound. In one illustrative example, a sound attenuation structure is provided for attenuating sound within a platform. The platform may take the form of, for example, without limitation, an aerospace vehicle, a ground vehicle, an engine system, an industrial system, or some other type of platform that generates sound at undesired levels.

The sound attenuation structure comprises a core. The core may comprise a plurality of cells having a selected geometry. The core may further comprise a set of channels through a number of cell interfaces between cells of the plurality of cells in which the set of channels allows air to flow between the cells of the plurality of cells. The set of channels has a configuration designed such that the core acoustically performs within selected tolerances.

As used herein, a "number of" items includes one or more items. In this manner, a number of cell interfaces may include one or more cell interfaces.

Figure 1:
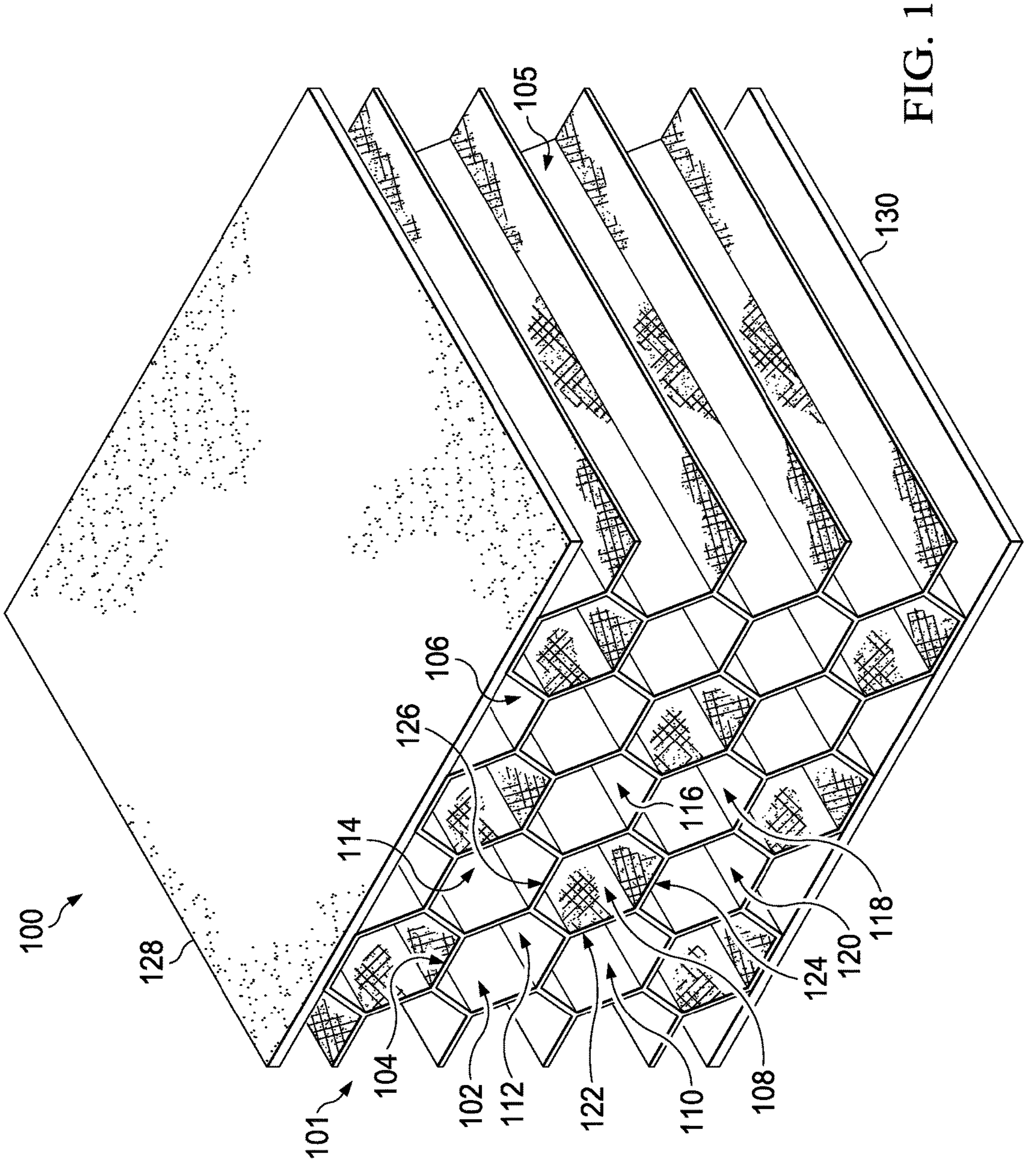
FIG. 1 is an illustration of an isometric view of a sound attenuation structure in accordance with an illustrative embodiment.

Referring now to the figures, and in particular, with reference to FIG. 1, an illustration of an isometric view of a sound attenuation structure is depicted in accordance with an illustrative embodiment. In this illustrative example, sound attenuation structure 100 has core 101. Core 101 has plurality of cells 102. In this illustrative example, core 101 is a honeycomb core. In other words, plurality of cells 102 of core 101 have a honeycomb geometry.

As depicted, plurality of cells 102 are closely packed such that plurality of cell interfaces 104 are formed between plurality of cells 102. Each of plurality of cell interfaces 104 is an interface between two cells of plurality of cells 102. Plurality of cell interfaces 104 may be formed by number of layers of material 105 that make up plurality of cells 102. A cell wall of one of plurality of cells 102 may be formed by one or more portions of a layer in number of layers of material 105. In some cases, a layer may form the cell wall of one cell and the cell wall of an adjoining cell. In this manner, each of plurality of cell interfaces 104 may be formed by one or more cell walls.

Core 101 also includes channels 106 through plurality of cell interfaces 104. Each of channels 106 may be an opening within a corresponding cell interface of plurality of cell interfaces 104 that allows air to flow through the corresponding cell interface between the two cells joined by the corresponding cell interface.

Cell 108 is an example of one of plurality of cells 102. Cell 108 is surrounded by cells 110, 112, 114, 116, 118, and

120. Cell 108 and cell 110 meet at cell interface 122. Air may flow between cell 108 and cell 110 through cell interface 122. Similarly, cell 108 and cell 120 meet at cell interface 124. Air may flow between cell 108 and cell 120 through cell interface 124. Additionally, cell 108 and cell 114 meet at cell interface 126. Air may flow between cell 108 and cell 114 through cell interface 126. In this manner, air may flow between cell 108 and multiple other cells of plurality of cells 102.

In particular, air may flow between multiple full cells of plurality of cells 102. When acoustic waves are traveling through the air, the flow of the air between the cells of plurality of cells 102 may attenuate the sound generated by the acoustic waves. This type of air flow between the cells of plurality of cells 102 may be referred to as "cross-talk" in this illustrative example.

In this illustrative example, first face sheet 128 and second face sheet 130 are coupled to core 101. First face sheet 128 may have a controlled porosity that allows air to flow through first face sheet 128 into plurality of cells 102. Second face sheet 130 is an impervious face sheet that causes the air, and thereby the acoustic waves flowing through plurality of cells 102, to reflect off of second face sheet 130 back into plurality of cells 102. Air that flows into core 101 through first face sheet 128 may flow into and between the cells of plurality of cells 102 and into the open spaces between the cells and first face sheet 128 and the open spaces between the cells and second face sheet 130. With the coupling of first face sheet 128 and second face sheet 130 to core 101, plurality of cells 102 form resonators.

Channels 106 may have a configuration designed such that a desired sound attenuation level may be achieved using sound attenuation structure 100. In particular, the size of each of channels 106, shape of each of channels 106, placement of each of channels 106, or some combination thereof may be designed such that a desired sound attenuation level may be achieved at each of a number of frequency ranges.

Figure 2:
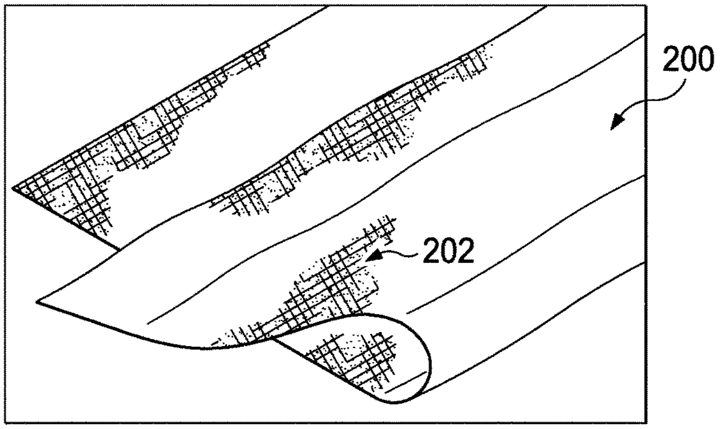
FIG. 2 is an illustration of a layer of material in accordance with an illustrative embodiment.
Figure 3:
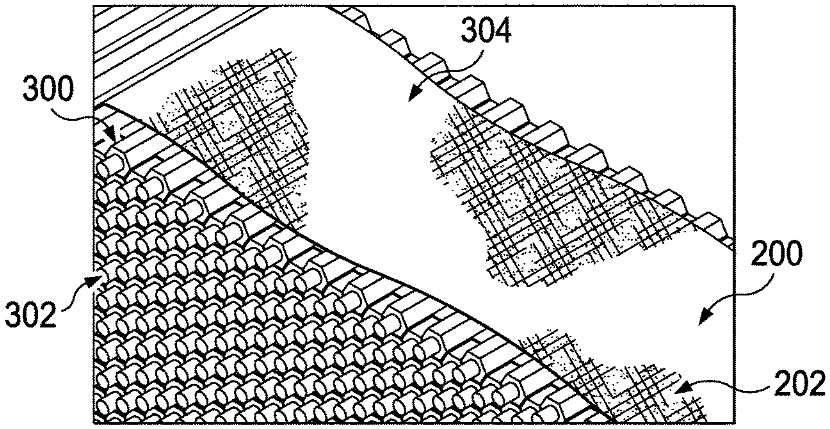
FIG. 3 is an illustration of an assembly of a number of layers of material around a plurality of mandrels in accordance with an illustrative embodiment.
Figure 4:
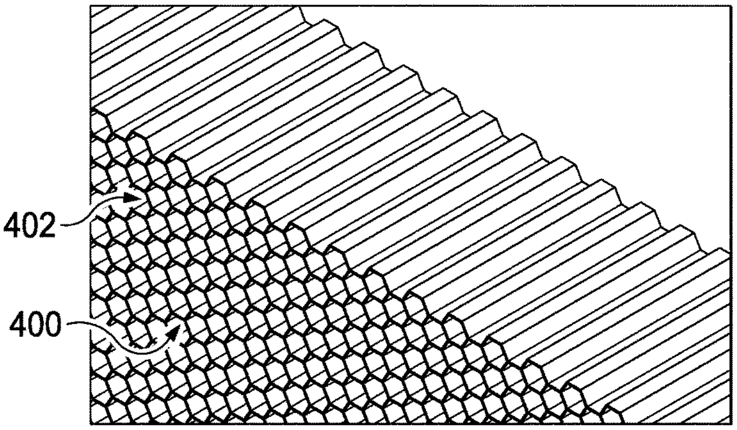
FIG. 4 is an illustration of a completed core in accordance with an illustrative embodiment.

With reference now to FIGS. 2-4, illustrations of a process for forming a core are depicted in accordance with an illustrative embodiment. The process described in FIGS. 2-4 may be used to form a core, such as core 101 in FIG. 1.

Turning now to FIG. 2, an illustration of a layer of material is depicted in accordance with an illustrative embodiment. In this illustrative example, layer 200 may be an example of one of number of layers of material 105 in FIG. 1. Layer 200 takes the form of a composite layer in this illustrative example. In particular, layer 200 may be comprised of a fabric material that has been impregnated with resin. In some cases, layer 200 may be referred to as a "prepreg."

As depicted, layer 200 has openings 202. The shape of each of openings 202, the size of each of openings 202, the placement of each of openings 202, or some combination thereof may be designed with the purpose of forming a core capable of acoustically performing to provide a desired sound attenuation level. For example, the shape of each of openings 202, the size of each of openings 202, the placement of each of openings 202, or some combination thereof may be designed prior to fabrication of layer 200. In other illustrative examples, the shape of each of openings 202, the size of each of openings 202, the placement of each of openings 202, or some combination thereof may be randomly selected or selected according to some other schema with the purpose of forming a core capable of acoustically performing to provide a desired sound attenuation level.

With reference now to FIG. 3, an illustration of an assembly of a number of layers of material around a plurality of mandrels is depicted in accordance with an illustrative embodiment. In this illustrative example, number of layers of material 300 are wrapped around plurality of mandrels 302 to form assembly 304. Number of layers of material 300 may include layer 200 shown in FIG. 2.

Each of plurality of mandrels 302 has a size and shape based on the desired cellular geometry for each of the cells that will form the core that will be formed using assembly 304. Each of number of layers of material 300 may have openings, similar to openings 202. When wrapped around plurality of mandrels 302 to establish the cellular geometry for the cells of the core, at least a portion of these openings in number of layers of material 300 may align to form channels.

Once fully assembled, assembly 304 may be cured to form the core (not shown). Plurality of mandrels 302 may then be removed from the fully formed core.

With reference now to FIG. 4, an illustration of a completed core is depicted in accordance with an illustrative embodiment. In this illustrative example, core 400 has been formed using assembly 304 in FIG. 3. As depicted, plurality of mandrels 302 have been removed from core, thereby forming plurality of cells 402 that are open. Further, channels may be present within the cell interfaces between plurality of cells 402. Core 400 may be coupled to a porous face sheet, such as first face sheet 128 in FIG. 1, and an impervious face sheet, such as second face sheet 130 in FIG. 1, to turn plurality of cells 402 into resonators capable of attenuating sound at a number of selected frequency ranges.

The illustrations of sound attenuation structure 100 in FIG. 1 and the process for forming a core in FIGS. 2-4 are not meant to imply physical or architectural limitations to the manner in which an illustrative example may be implemented. The different structural elements shown in FIGS. 1-4 may be illustrative examples of how elements shown in block form in FIG. 5 below can be physically implemented.

Figure 5:
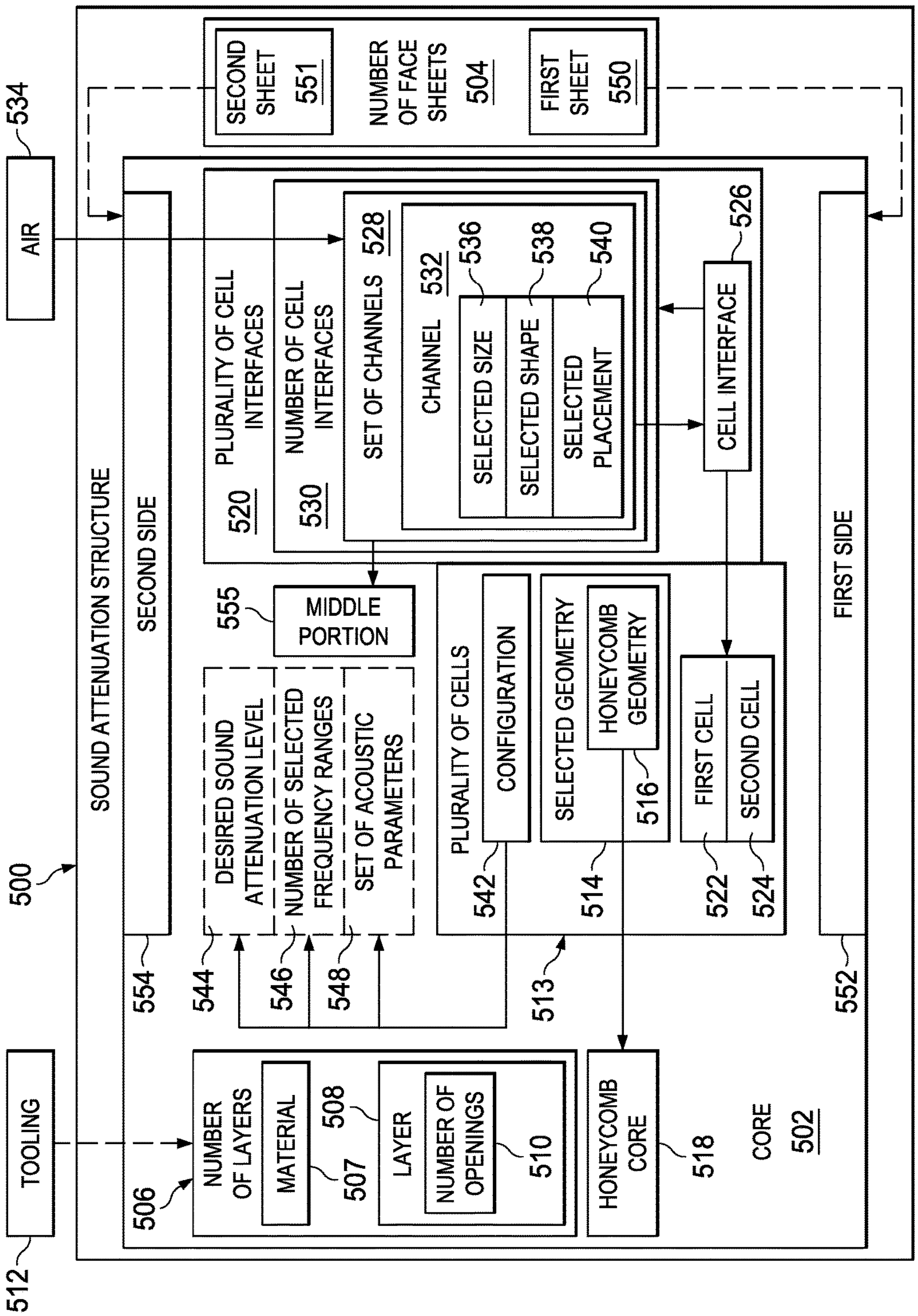
FIG. 5 is an illustration of a sound attenuation structure in the form of a block diagram in accordance with an illustrative embodiment.

With reference now to FIG. 5, an illustration of a sound attenuation structure is depicted in the form of a block diagram in accordance with an illustrative embodiment. Sound attenuation structure 100 in FIG. 1 is an example of one implementation for sound attenuation structure 500 shown in FIG. 5.

In this illustrative example, sound attenuation structure 500 includes core 502. Core 101 in FIG. 1 and core 400 in FIG. 4 may be examples of implementations for core 502 in FIG. 5. In some illustrative examples, sound attenuation structure 500 may also include number of face sheets 504. First face sheet 128 in FIG. 1 is an example of one implementation for number of face sheets 504.

Core 502 may be comprised of number of layers 506 of material 507. Number of layers of material 300 in FIG. 3 may be an example of one implementation for number of layers 506 of material 507. Each layer in number of layers 506 of material 507 may take a number of different forms. For example, without limitation, a layer in number of layers 506 may be comprised of at least one of a fabric material, a fiber-reinforced material, a polymer, or some other type of material.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

At least one layer in number of layers 506 may have at least one opening. For example, layer 508 in number of layers 506 may have number of openings 510. An opening in number of openings 510 may have any of a number of different shapes. For example, an opening may have a circular shape, an oval shape, a square shape, a rectangular shape, a polygonal shape, a slit-type shape, an amorphous shape, or some other type of shape. The opening may have a size that ranges from, for example, without limitation, about 10 micrometers (μm) to about 20 centimeters (cm), depending on the implementation.

Further, in some illustrative examples, each of number of openings 510 may have a designed placement along layer 508. For example, layer 508 may be fabricated having number of openings 510 that are arranged along layer 508 according to a preselected pattern.

In one illustrative example, all of number of openings 510 may be located at one end of layer 508. In another illustrative example, a first portion of openings 510 may be located at one end of layer 508, while a second portion of number of openings 510 may be located at another end of layer 508. In yet another illustrative example, all of number of openings 510 may be located within a middle portion of layer 508.

In this manner, number of openings 510 may be arranged along layer 508 in a number of different ways. In other illustrative examples, the placement of number of openings 510 may not be important to the design of core 502. For example, without limitation, only the shape and size of each of number of openings 510 may be important to the design of core 502. In this example, number of openings 510 may be arranged randomly along layer 508.

Number of openings 510 may be formed within layer 508 in a number of different ways. As one illustrative example, without limitation, layer 508 may be woven in a manner that creates number of openings 510. In another illustrative example, layer 508 may take the form of a perforated fabric layer or some other type of layer having number of openings 510.

Number of layers 506 may be assembled using tooling 512 such that number of layers 506 form plurality of cells 513. Tooling 512 may include any number of molds, mandrels, or other types of tools. In particular, number of layers 506 may be assembled such that plurality of cells 513 are formed having selected geometry 514.

Selected geometry 514 may be, for example, without limitation, an arrangement of polygonal prisms, an arrangement of cylindrical members, or some other type of arrangement. As one illustrative example, with selected geometry 514, each of plurality of cells 513 may take the shape of a polygonal prism that is n-sided. The polygonal prism may take the form of, for example, a triangular prism, a rectangular prism, a hexagonal prism, a pentagonal prism, an octagonal prism, or some other type of a polygonal prism.

In one illustrative example, selected geometry 514 takes the form of honeycomb geometry 516. Honeycomb geometry 516 is a geometry in which plurality of cells 513 form, for example, a grid of hexagonal prisms. When selected geometry 514 takes the form of honeycomb geometry 516, core 502 may be referred to as honeycomb core 518.

With selected geometry 514, plurality of cells 513 may be closely packed such that plurality of cells 513 have plurality of cell interfaces 520. First cell 522 and second cell 524 are examples of cells in plurality of cells 513. First cell 522 and second cell 524 may meet at cell interface 526, which may be an example of one plurality of cell interfaces 520.

Cell interface 526 may be formed by one or more cell walls. As one illustrative example, first cell 522 and second cell 524 may share a cell wall that forms cell interface 526. In another illustrative example, first cell 522 may have a first cell wall that meets a second cell wall of second cell 524. The first cell wall and the second cell wall both form cell interface 526 in this example.

Number of layers 506 may be assembled such that the one or more openings in number of layers 506 form at least one channel through at least one of plurality of cell interfaces 520. For example, plurality of cells 513 may be formed having set of channels 528 through number of cell interfaces 530 of plurality of cell interfaces 520. Number of cell interfaces 530 may include one, some, or all of the cell interfaces in plurality of cell interfaces 520.

Each channel in set of channels 528 is a passage through a corresponding cell interface that connects one cell to another cell. For example, channel 532 may be present through cell interface 526. Channel 532 may connect first cell 522 to second cell 524 such that air 534 may flow between first cell 522 and second cell 524 through channel 532. In other words, channel 532 may enable "cross-talk" between first cell 522 and second cell 524.

In some illustrative examples, this type of "cross-talk" may be created between at least three cells of plurality of cells 513 to attenuate sound. Depending on the implementation, the flow of air between the cells of plurality of cells 513 may occur by air flowing through one, some, or all of the cell interfaces in plurality of cell interfaces 520. Further, depending on which of plurality of cell interfaces 520 through which air travels, air may be allowed to flow between the particular cell and one or more cells adjacent to the particular cell, while air may not be allowed to flow between the particular cell and one or more other cells adjacent to the particular cell.

Channel 532 may have at least one of selected size 536, selected shape 538, or selected placement 540. Each of selected size 536, selected shape 538, and selected placement 540 may be a design consideration based on the acoustic performance desired from core 502.

Selected size 536 may be defined using any number of dimensions for channel 532. In one illustrative example, selected size 536 may be defined as a width or diameter of channel 532. Selected size 536 may be, for example, without limitation, a size that ranges from, for example, without limitation, about 10 micrometers (μm) to about 20 centimeters (cm), depending on the implementation.

Selected shape 538 may take a number of different forms. Selected shape 538 may be, for example, without limitation, a circular shape, an oval shape, a square shape, a rectangular shape, a polygonal shape, a slit-type shape, an amorphous shape, or some other type of shape. Selected placement 540 is the location of channel 532 along cell interface 526. In some cases, selected placement 540 may be defined as a three-dimensional location for channel 532 with respect to a reference coordinate system for core 502.

In this manner, each of set of channels 528 may be tailored based on the desired acoustic performance for core 502. In particular, set of channels 528 may have configuration 542 designed such that core 502 acoustically performs within selected tolerances. Acoustically performing within selected tolerances may include providing desired sound attenuation level 544 for number of selected frequency ranges 546. In particular, acoustically performing within selected tolerances may include attenuating the sound that falls within number of selected frequency ranges such that sound levels are below a selected threshold, which may be defined in decibels (dB). Depending on the implementation, number of selected frequency ranges 546, the selected tolerances, and the selected threshold may be determined based on the system generating the sound that is being attenuated.

Configuration 542 may include at least one of a selected shape, a selected size, or a selected placement for at least one channel of set of channels 528. Designing configuration 542 such that core 502 will acoustically perform as desired means designing configuration 542 with respect to set of acoustic parameters 548. Set of acoustic parameters 548 includes at least one of impedance, reactance, resistance, and sound attenuation level.

Impedance consists of an imaginary part and a real part. Designing configuration 542 with respect to impedance may include designing configuration 542 such that core 502 achieves desired values for at least one of the imaginary part of the impedance, the real part of the impedance, or the cross correlation of both the imaginary part and the real part of the impedance for number of selected frequency ranges 546.

Configuration 542 may be designed in any number of different ways to achieve the desired acoustic performance by core 502. In one illustrative example, one portion of set of channels 528 may be configured to provide desired values for set of acoustic parameters 548 at one selected frequency range, while another portion of set of channels 528 may be configured to provide desired values for set of acoustic parameters 548 at another selected frequency range.

Core 502 having set of channels 528 between cells of plurality of cells 513 forms a resonant device that provides the desired sound attenuation level. In one illustrative example, number of face sheets 504 may be coupled to core 502 to turn plurality of cells 513 into resonators.

For example, number of face sheets 504 may include first face sheet 550 and second face sheet 551. First face sheet 550 may be coupled to first side 552 of core 502 and second face sheet 551 may be coupled to second side 554 of core 502.

First side 552 of core 502 is formed by a first portion of plurality of cells 513. In particular, first side 552 may be formed by a portion of the cell walls of the first portion of plurality of cells 513. Similarly, second side 554 of core 502 is formed by a second portion of plurality of cells 513. In particular, second side 554 may be formed by a portion of the cell walls of the second portion of plurality of cells 513.

Depending on the implementation, one of first face sheet 550 and second face sheet 551 may be a porous face sheet, while the other may be an impervious face sheet. The porous face sheet may contain a controlled percent open area (POA) that enables the controlled flow of air 534 into core 502. For example, the porous face sheet may be configured such that only acoustic waves of certain frequencies and wavelengths enter core 502. The impervious face sheet enables the reflection of these acoustic waves. Thus, the coupling of first face sheet 550 and second face sheet 551 to core 502 creates a controlled resonator-type effect.

In one illustrative example, set of channels 528 may be entirely located within middle portion 555 of core 502 between first side 552 and second side 554. For example, set of channels 528 may be configured such that set of channels 528 is located some selected distance away from first side 552 and second side 554.

By using set of channels 528 to attenuate sound, sound attenuation structure 500 provides a cost-effective measure for attenuating sound that also does not increase the weight of the platform within which sound attenuation structure 500 is implemented more than desired. In particular, cost and weight savings may be gained using sound attenuation structure 500 having core 502 with set of channels 528 as compared to a different structure having a core with cells that have internal septa.

Figure 6:
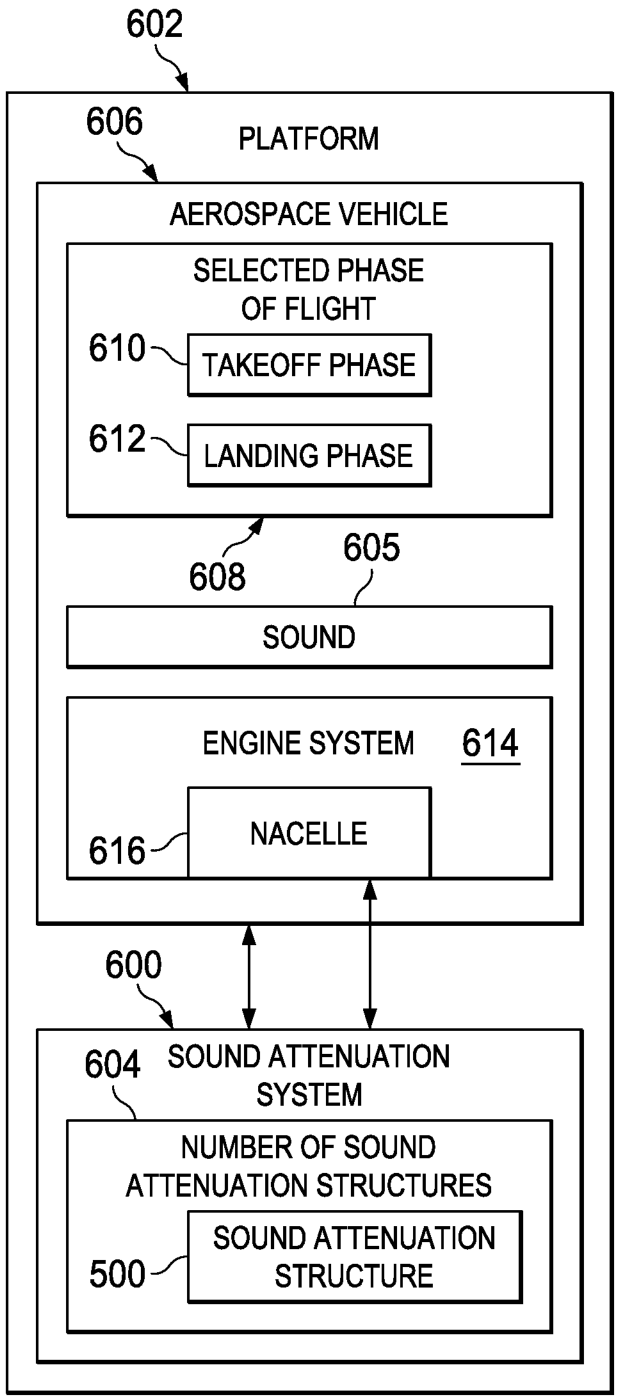
FIG. 6 is an illustration of a sound attenuation system associated with a platform in the form of a block diagram in accordance with an illustrative embodiment.

With reference now to FIG. 6, an illustration of a sound attenuation system associated with a platform is depicted in the form of a block diagram in accordance with an illustrative embodiment. In this illustrative example, sound attenuation system 600 may be associated with platform 602. As used herein, when one component is "associated" with another component, the association is a physical association in the depicted examples.

For example, a first component, such as sound attenuation system 600, may be considered to be associated with a second component, such as platform 602, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

Sound attenuation system 600 includes number of sound attenuation structures 604. In this illustrative example, each of number of sound attenuation structures 604 may be implemented in a manner similar to sound attenuation structure 500 described in FIG. 5. In one illustrative example, number of sound attenuation structures 604 includes sound attenuation structure 500 described in FIG. 5.

Platform 602 generates sound 605 that may need to be attenuated. Platform 602 may take a number of different forms. For example, platform 602 may take the form of an aerial vehicle, a space vehicle, a ground vehicle, an engine system, an industrial system, a ship, a motorized system, or some other type of platform that generates undesired sound.

In one illustrative example, platform 602 takes the form of aerospace vehicle 606. Sound attenuation system 600 may be used to attenuate sound during at least one selected phase of flight 608 for aerospace vehicle 606. For example, selected phase of flight 608 may be selected from one of takeoff phase 610, landing phase 612, or some other phase of flight.

In one illustrative example, aerospace vehicle 606 includes engine system 614. Engine system 614 may include nacelle 616. Depending on the implementation, one or more of number of sound attenuation structures 604 may be associated with nacelle 616 of engine system 614 or some other component of engine system 614. In other illustrative examples, one or more of number of sound attenuation structures 604 may be associated with some other structural component of aerospace vehicle 606.

Sound attenuation system 600 provides a cost-effective measure for attenuating sound produced by platform 602 within a number of selected frequency ranges. Further, sound attenuation system 600 may not increase the weight of platform 602 more than desired.

The illustrations of sound attenuation structure 500 in FIG. 5 and sound attenuation system 600 in FIG. 6 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, multiple sound attenuation systems may be associated with aerospace vehicle 606 in FIG. 6. In some illustrative examples, set of channels 528 may not just be located with middle portion 555.

Figure 7:
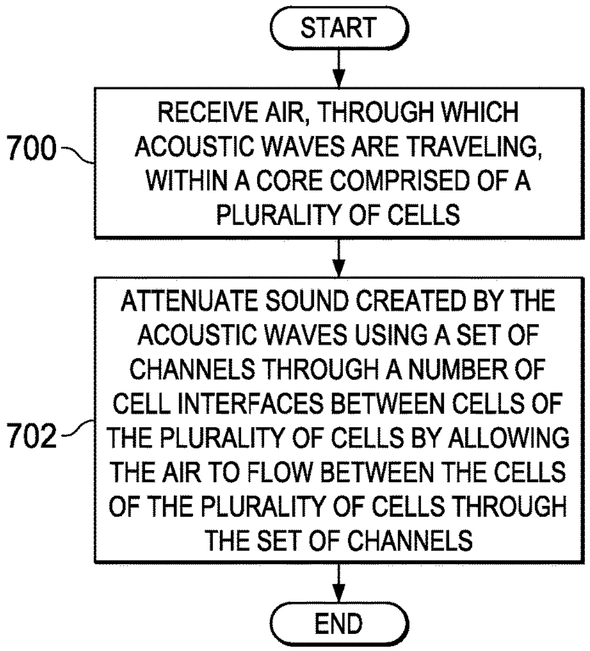
FIG. 7 is an illustration of a process for attenuating sound in the form of a flowchart in accordance with an illustrative embodiment.

With reference now to FIG. 7, an illustration of a process for attenuating sound is depicted in the form of a flowchart in accordance with an illustrative embodiment. The process illustrated in FIG. 7 may be implemented using a core, such as core 502 in FIG. 5.

The process may begin by receiving air, through which acoustic waves are traveling, within a core comprised of a plurality of cells (operation 700). In one illustrative example, the air may be received within the core through openings in a face sheet that is coupled to the core. The sound created by the acoustic waves is attenuated using a set of channels through a number of cell interfaces between cells of the plurality of cells by allowing the air to flow between the cells of the plurality of cells through the set of channels (operation 702), with the process terminating thereafter.

Figure 8:
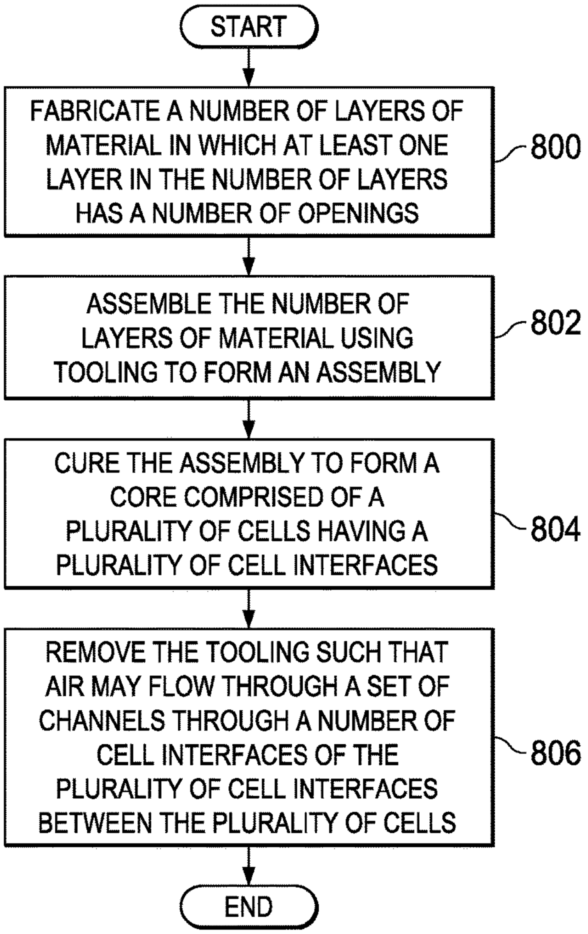
FIG. 8 is an illustration of a process for manufacturing a sound attenuation structure in the form of a flowchart in accordance with an illustrative embodiment.

With reference now to FIG. 8, an illustration of a process for manufacturing a sound attenuation structure is depicted in the form of a flowchart in accordance with an illustrative embodiment. The process illustrated in FIG. 8 may be implemented to manufacture a sound attenuation structure, such as sound attenuation structure 500 in FIG. 5, which includes a core, such as core 502 in FIG. 5.

The process may begin by fabricating a number of layers of material in which at least one layer in the number of layers has a number of openings (operation 800). In one illustrative example, each of the number of layers of material in operation 800 may be a composite layer material. For example, one layer of material may take the form of a layer of fabric that has been impregnated with resin. In other illustrative examples, one or more of the number of layers of material may take the form of a layer of fabric without resin.

Thereafter, the number of layers of material are assembled using tooling to form an assembly (operation 802). In operation 802, the tooling may include one or more mandrels, molds, or other types of tools. Next, the assembly may be cured to form a core comprised of a plurality of cells having a plurality of cell interfaces (operation 804).

The tooling is then removed such that air may flow through a set of channels through a number of cell interfaces of the plurality of cell interfaces between the plurality of cells (operation 806), with the process terminating thereafter. The final product formed by operation 806 may be used to achieve a desired level of sound attenuation for a number of selected frequency ranges.

Figure 9:
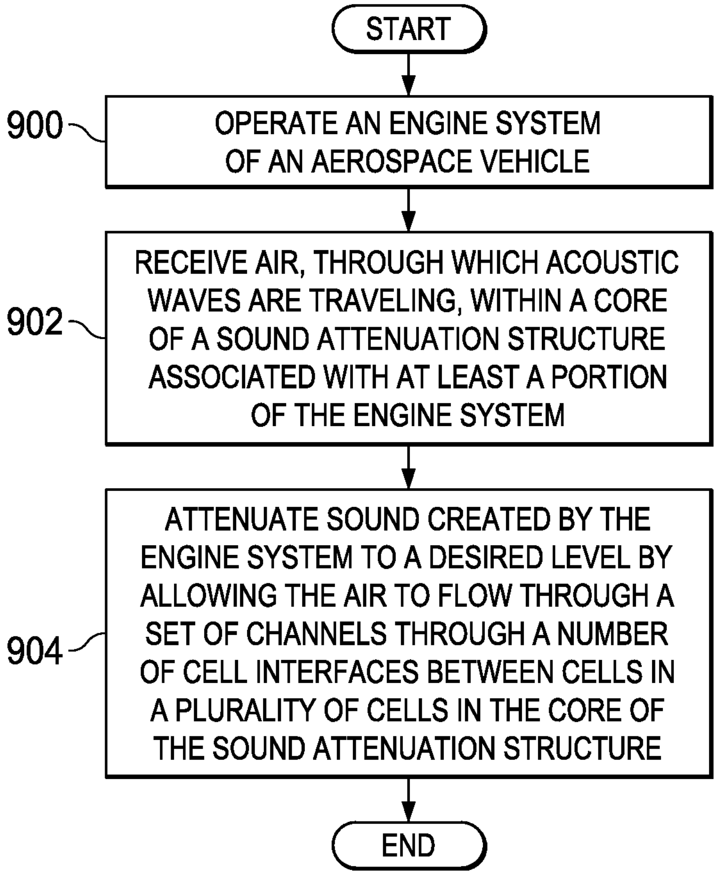
FIG. 9 is an illustration of a process for attenuating sound created by an engine system of an aerospace vehicle in the form of a flowchart in accordance with an illustrative embodiment.

With reference now to FIG. 9, an illustration of a process for attenuating sound created by an engine system of an aerospace vehicle is depicted in the form of a flowchart in accordance with an illustrative embodiment. The process illustrated in FIG. 9 may be implemented using a sound attenuation structure, such as sound attenuation structure 500 in FIG. 5.

The process may begin by operating an engine system of an aerospace vehicle (operation 900). Next, air, through which acoustic waves are traveling, is received within a core of a sound attenuation structure associated with at least a portion of the engine system (operation 902). In operation 902, the air flows through core such that at least a portion of the acoustic waves enter the core. In one illustrative example, the sound attenuation structure may take the form of a panel that is attached to an inner wall of a duct in the engine system.

The sound created by the engine system is attenuated to a desired level by allowing the air to flow through a set of channels through a number of cell interfaces between cells in a plurality of cells in the core of the sound attenuation structure (operation 904), with the process terminating thereafter. In other words, in operation 904, a desired level of sound attenuation may be achieved through "cross-talk" between at least a portion of the cells that make up the core of the sound attenuation structure.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 10:
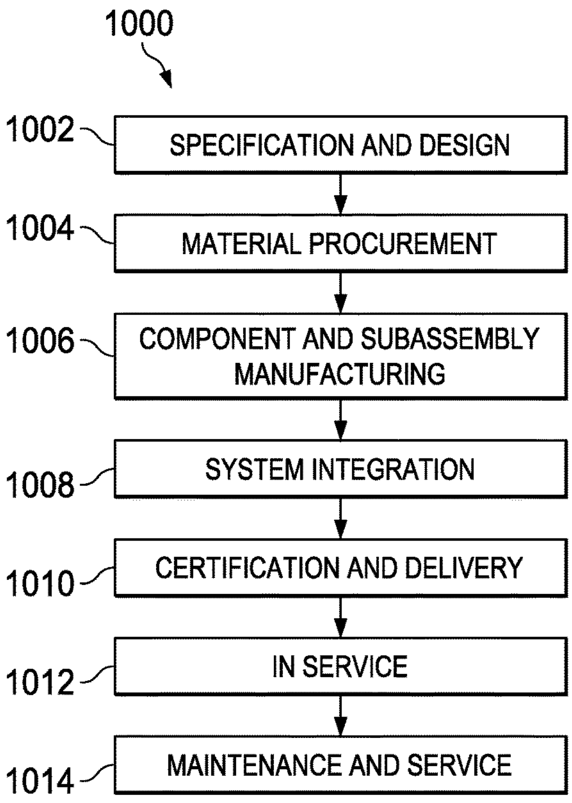
FIG. 10 is an illustration of an aircraft manufacturing and service method in the form of a block diagram in accordance with an illustrative embodiment.
Figure 11:
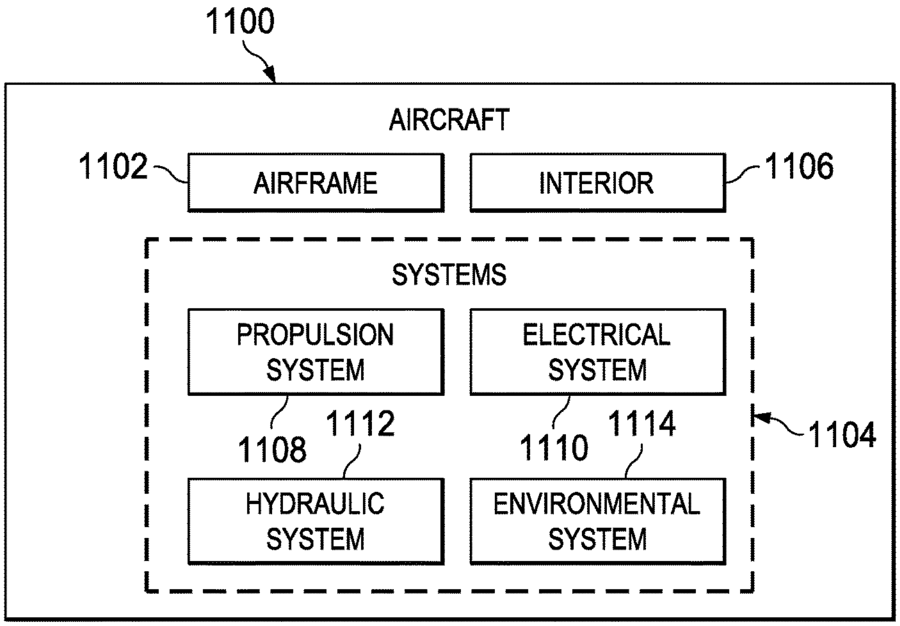
FIG. 11 is an illustration of an aircraft in the form of a block diagram in which an illustrative embodiment may be implemented.

The illustrative embodiments of the disclosure may be described in the context of aircraft manufacturing and service method 1000 as shown in FIG. 10 and aircraft 1100 as shown in FIG. 11. Aircraft 1100 in FIG. 11 is an example of one implementation for aerospace vehicle 606 in FIG. 6.

Turning first to FIG. 10, an illustration of an aircraft manufacturing and service method is depicted in the form of a block diagram in accordance with an illustrative embodiment. During pre-production, aircraft manufacturing and service method 1000 may include specification and design 1002 of aircraft 1100 in FIG. 11 and material procurement 1004.

In one illustrative example, component and subassembly manufacturing 1006 and system integration 1008 of aircraft 1100 in FIG. 11 take place during production. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Engine system 614 in FIG. 6 may be an example of one implementation for a component that may be included as part of propulsion system 1108. Any number of other systems may be included. Although an aerospace example is shown, different illustrative embodiments may be applied to other industries, such as the automotive industry.

The apparatuses and methods embodied herein may be employed during at least one of the stages of aircraft manufacturing and service method 1000 in FIG. 10. In particular, sound attenuation structure 500 from FIG. 5 may be associated with aircraft 1100 during any one of the stages of aircraft manufacturing and service method 1000. For example, without limitation, sound attenuation structure 500 from FIG. 5 may be attached to one or more components of propulsion system 1108 of aircraft 1100 during at least one of component and subassembly manufacturing 1006, system integration 1008, routine maintenance and service 1014, or some other stage of aircraft manufacturing and service method 1000.

Still further, sound attenuation structure 500 from FIG. 5 may be used to attenuate sound produced by aircraft 1100 during operation of aircraft 1100. As one illustrative example, sound attenuation structure 500 may be used to attenuate sound produced by propulsion system 1108 of aircraft 1100 having frequencies within a number of selected frequency ranges of operation of aircraft 1100 while aircraft 1100 is in service 1012.

In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10. As yet another example, one or more apparatus embodiments, method embodiments, or a combination thereof may be utilized during production stages, such as component and subassembly manufacturing 1006 and system integration 1008 in FIG. 10. One or more apparatus embodiments, method embodiments, or a combination thereof may be utilized while aircraft 1100 is in service 1012 and/or during maintenance and service 1014 in FIG. 10. The use of a number of the different illustrative embodiments may substantially expedite the assembly of and/or reduce the cost of aircraft 1100.

Thus, the illustrative embodiments provide a method and apparatus for attenuating sound. In one illustrative example, a sound attenuation structure, such as sound attenuation structure 500 in FIG. 5, is provided for attenuating sound within a platform. The platform may take the form of, for example, without limitation, an aerospace vehicle, a ground vehicle, an engine system, an industrial system, or some other type of platform that generates sound at undesired levels.

The sound attenuation structure comprises a core. The core may comprise a plurality of cells having a selected geometry. The core may further comprise a set of channels through a number of cell interfaces between cells of the plurality of cells in which the set of channels allows air to flow between the cells of the plurality of cells. The set of channels has a configuration designed such that the core acoustically performs within selected tolerances. For example, the sound attenuation structure may ensure that sound that falls within a number of selected frequency ranges is attenuated such that sound levels are below a selected decibel (dB) threshold.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:

a plurality of cells that form a core, wherein the plurality of cells comprises a number of layers of resin-impregnated fabric; and a set of channels through a number of cell interfaces between cells of the plurality of cells in which the set of channels allows air to flow between the cells of the plurality of cells, wherein the set of channels has a configuration designed such that the core acoustically performs within selected tolerances, wherein the set of channels includes a first portion and a second portion, wherein the first portion of the set of channels each has at least one of a different size or a different shape than the second portion of the set of channels;

wherein the core has a first side, a second side opposite the first side, and a middle portion extending between the first side and the second side such that the first side and the second side are formed by the plurality of cells, and wherein the channels are located in the middle portion a selected distance away from the first side and the second side.

2. The apparatus of claim 1, wherein the air flowing between the cells creates cross-talk between at least three of the plurality of cells to attenuate sound.

3. The apparatus of claim 1, wherein the core is configured for association with an aerospace vehicle.

4. The apparatus of claim 3, wherein the configuration is designed to achieve a desired sound attenuation level during a selected phase of flight for the aerospace vehicle, wherein the selected phase of flight is selected from one of a takeoff phase and a landing phase.

5. The apparatus of claim 1, wherein the core is configured for association with an engine system in an aerospace vehicle to attenuate sound generated by the engine system.

6. The apparatus of claim 1, wherein the core is configured for association with a nacelle.

7. The apparatus of claim 1 further comprising:

a face sheet coupled to the core, wherein the face sheet is selected from one of an impervious face sheet and a porous face sheet.

8. The apparatus of claim 1, wherein:

the first side is formed by a first portion of the plurality of cells; and the second side is formed by a second portion of the plurality of cells.

9. The apparatus of claim 1, wherein the plurality of cells is formed by a number of layers of material in which a layer in the number of layers of the material has a number of openings.

10. The apparatus of claim 1, wherein the configuration for the set of channels includes at least one of a selected shape, a selected size, or a selected placement for at least one channel of the set of channels.

11. The apparatus of claim 1, wherein the configuration is designed with respect to a set of acoustic parameters that determines an acoustic performance of the core, wherein the set of acoustic parameters includes at least one of impedance, resistance, reactance, or a sound attenuation level.

12. The apparatus of claim 1, wherein the core having the set of channels between the cells of the plurality of cells forms a resonant device that provides a desired sound attenuation level.

13. A sound attenuation structure comprising:

a core, wherein the core comprises:

a plurality of cells having a selected geometry, wherein the plurality of cells comprises a number of layers of resin-impregnated fabric; and a set of channels through a number of cell interfaces between cells of the plurality of cells in which the set of channels allows air to flow between the cells of the plurality of cells, wherein the set of channels has a configuration designed such that the core acoustically performs within selected tolerances, wherein the set of channels includes a first portion and a second portion, wherein the first portion of the set of channels each has at least one of a different size or a different shape than the second portion of the set of channels; and wherein the core has a first side, a second side opposite the first side, and a middle portion extending between the first side and the second side such that the first side and the second side are formed by the plurality of cells, and wherein the channels are located in the middle portion a selected distance away from the first side and the second side.

14. The sound attenuation structure of claim 13 further comprising:

a first face sheet coupled to the core; and a second face sheet coupled to the core.

15. The sound attenuation structure of claim 14, wherein the first face sheet is an impervious face sheet and the second face sheet is a porous face sheet.

16. The sound attenuation structure of claim 13, wherein the core is a honeycomb core in which the selected geometry is a honeycomb geometry.

17. A method for attenuating sound, the method comprising:

receiving air through which acoustic waves are traveling within a core comprised of a plurality of cells, wherein the plurality of cells comprises a number of layers of resin-impregnated fabric; and attenuating the sound created by the acoustic waves using a set of channels through a number of cell interfaces between cells of the plurality of cells by allowing the air to flow between the cells of the plurality of cells through the set of channels, wherein the set of channels includes a first portion and a second portion, wherein the first portion of the set of channels each has at least one of a different size or a different shape than the second portion of the set of channels; wherein the core has a first side, a second side opposite the first side, and a middle portion extending between the first side and the second side such that the first side and the second side are formed by the plurality of cells, and wherein the channels are located in the middle portion a selected distance away from the first side and the second side.

18. The method of claim 17, wherein receiving the air comprises:

receiving the air through a face sheet coupled to the core, wherein the air flows through the face sheet into the core.

19. The method of claim 17, wherein attenuating the sound comprises:

attenuating the sound created by the acoustic waves using the set of channels, wherein the set of channels has a configuration designed with respect to a set of acoustic parameters that determines an acoustic performance of the core, and wherein the set of acoustic parameters includes at least one of impedance, reactance, or a sound attenuation level.

* * * * *